United States Patent [19]

Ii et al.

[11] Patent Number: 5,138,501
[45] Date of Patent: Aug. 11, 1992

[54] MAGNETIC RECORDER/REPRODUCER FOR RECORDING DIGITAL SIGNAL ON A PLURALITY OF TRACKS OF MAGNETIC RECORDING MEDIA AND REPRODUCING THE SAME

[75] Inventors: Hiroshi Ii; Yukihiko Haikawa, both of Hiroshima, Japan

[73] Assignee: Sharp Kabushiki Kaisha, Osaka, Japan

[21] Appl. No.: 493,347

[22] Filed: Mar. 14, 1990

[30] Foreign Application Priority Data

Mar. 17, 1989 [JP] Japan .................................. 1-66688

[51] Int. Cl.⁵ .............................................. G11B 5/09
[52] U.S. Cl. ...................................... 360/32; 360/72.2
[58] Field of Search ..................... 360/32, 33.1, 72.2; 358/339

[56] References Cited

U.S. PATENT DOCUMENTS 4,704,640 11/1987 Okamoto et al. ..................... 360/32
4,835,627 5/1989 Endo et al. ............................. 360/32

Primary Examiner—Vincent P. Canney

[57] ABSTRACT

A magnetic recording and reproducing apparatus for recording digital signals of a plurality of channels on tracks on magnetic recording medium and reproducing the same includes an A/D converter for converting analog video signals to digital signals, a signal dividing circuit for dividing the digital signals into first and second digital signals having first and second bit numbers for each channel, a signal permuting circuit for permuting the first and second digital signals of the same channel so as to be recorded on different tracks separately, a magnetic head for recording the permuted first and second digital signals on the different tracks and separately reproducing the same, a signal generating circuit for generating digital signals having a predetermined bit number based on the reproduced first and second digital signals, and a D/A converter for converting generated digital signals into analog signals. The externally applied digital signals are divided into signals of a higher and lower bit groups by the signal dividing circuit. The divided higher and lower bit group signals are permuted and recorded on the separate tracks. The recorded higher and lower bit group signals are separately reproduced. The separately reproduced higher and lower bit group signals are selected by the signal generating circuit, permuted once again and outputted as the original digital signals. The digital signals are converted into analog signals and supplied to other video equipments.

22 Claims, 12 Drawing Sheets

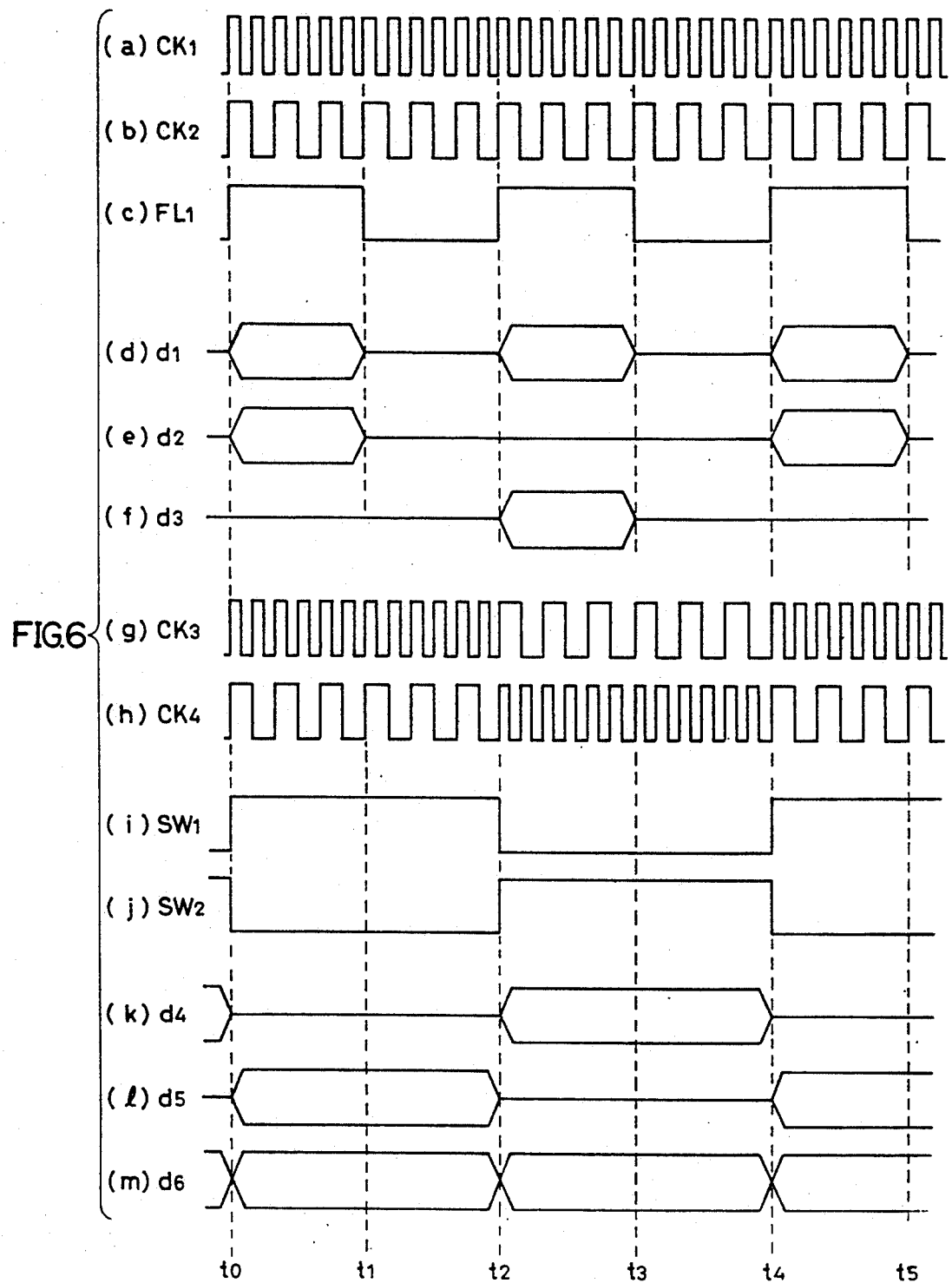

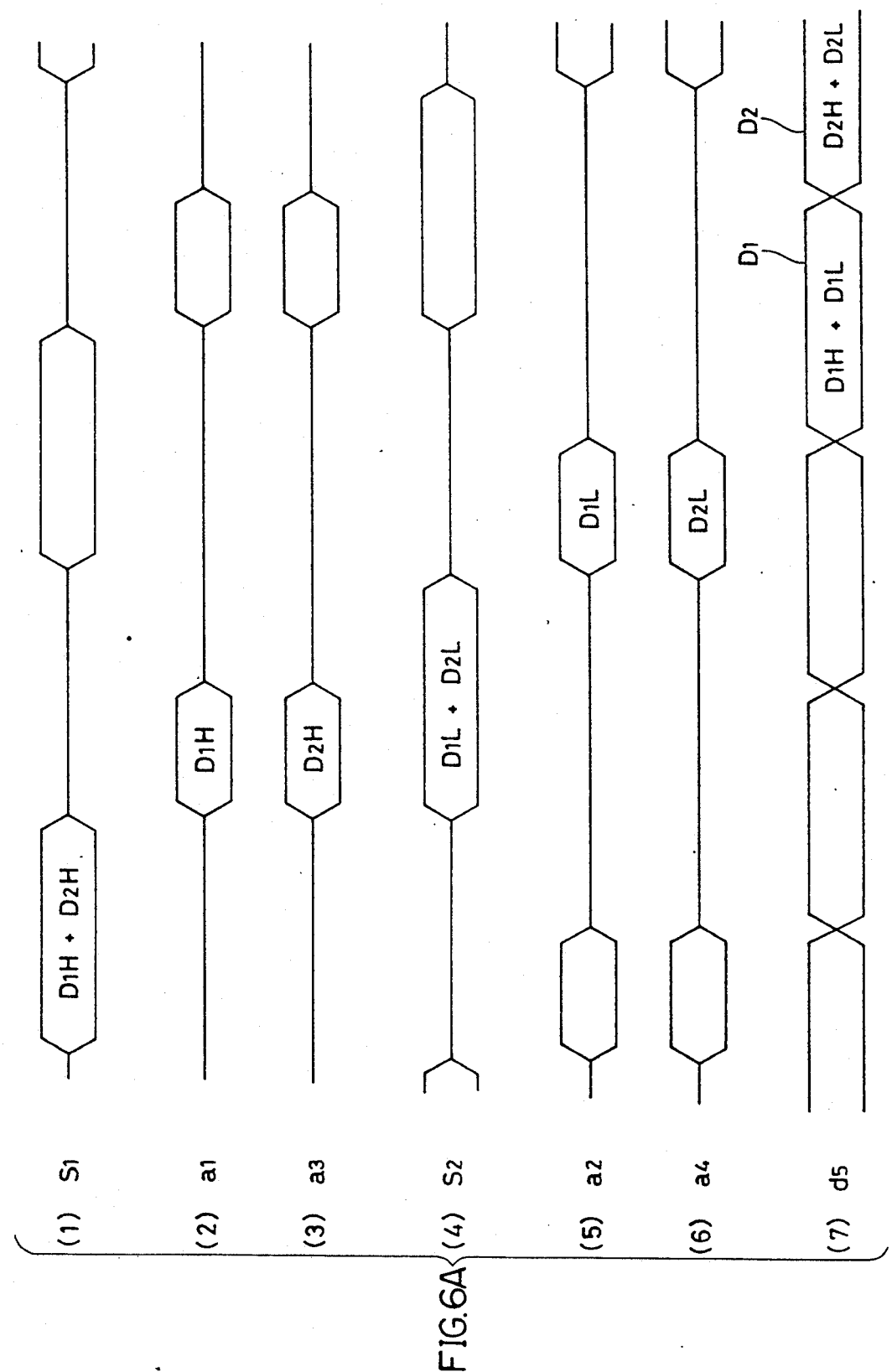

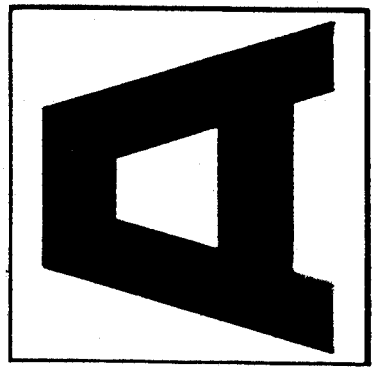
FIG.10A ORIGINAL IMAGE
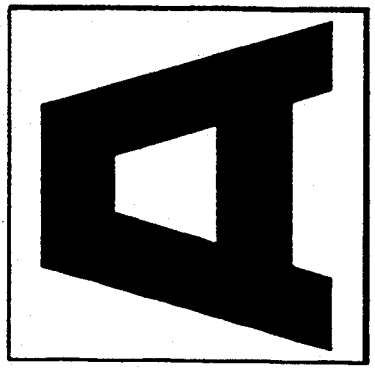
FIG.10B ⓐ+ⓑ+ⓒ+ⓓ
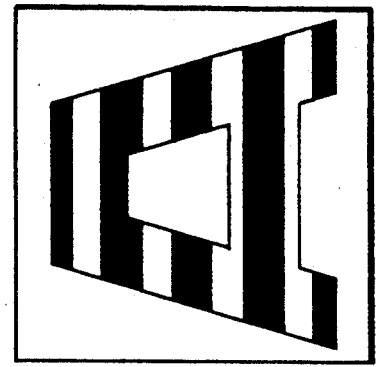
FIG.10E ⓐ+ⓑ+ⓒ
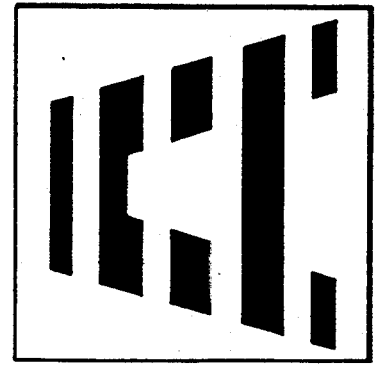
FIG.10D ⓐ+ⓑ
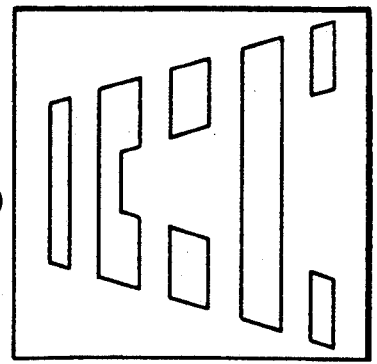
FIG.10C ⓐ

MAGNETIC RECORDER/REPRODUCER FOR RECORDING DIGITAL SIGNAL ON A PLURALITY OF TRACKS OF MAGNETIC RECORDING MEDIA AND REPRODUCING THE SAME

BACKGROUND OF THE INVENTION

1. Field of the Invention

The present invention relates generally to apparatus for recording/reproducing signals on recording media such as magnetic tapes in a digital manner, and more particularly, magnetic recorder/reproducer for digitally recording image on a digital audio tape and reproducing the same.

2. Description of the Related Art

A magnetic tape recorder/reproducer which is widely known is called a DAT (Digital Audio Tape recording and reproducing apparatus) for and is used converting audio signals into digital signals to record-/reproduce the converted signals on a magnetic tape. Through the use of digital signals, the DAT is capable of duplicating the audio signals repeatedly without deterioration in sound quality.

In addition, the DAT generally employs an error correcting code in recording/reproducing a digital signal. As a result, original sound can be reproduced with high fidelity. Even if a part of the information drops out due to defects of the tape or the like, so that the information can not be corrected by the error correcting code, the dropped out signal can be digitally compensated for. Accordingly, the DAT is capable of reproducing an audio signal with an extremely little noise.

Such a magnetic tape recording and reproducing apparatus has operation modes such as a 2 channel mode and a 4 channel mode corresponding to audio signals to be recorded. In the 2 channel mode, there on a magnetic tape are individually recorded two types of audio signals to be converted into sound by two speakers located at a left forward side and a right forward side of the audience. In the 4 channel modes, recorded individually on the magnetic tape are four types of signals which correspond to 4 speakers located at a left forward, a right forward, a left backward and a right backward sides of the audience, respectively.

In recent years, techniques have been developed for recording not only audio but also video signals by a magnetic tape recording and reproducing apparatus.

The present invention relates to a technique for recording/reproducing, as well as audio signals, video signals representing image in such a magnetic recording and reproducing apparatus. FIG. 1 shows a portion for reproducing video signals representing a still image of a magnetic recording/reproducing apparatus directed to such technique.

Referring to FIG. 1, the illustrated magnetic recording and reproducing apparatus having a still image reproducing system employs 4 channel mode as an operation mode. A recording system (not shown) of the apparatus records digital data of one frame of a video signal on the first to fourth recording tracks T1-T4 of a magnetic tape 1 shown in FIG. 3.

Referring to FIG. 2, a dotted line 17 indicates a scanning line of a first field in an image frame 16. Video signals in the first field are sampled at 256 sampling points (1), (2), (3) ... (256). The first 128 sampled data (data S1-S128 at the sampling points (1)-(128)) is recorded on the first recording track T1. The subsequent 128 data (data S129-S256 at the sampling points (129)-(256)) is recorded on the second recording track T2.

Similarly, video signals on a scanning line of a second field indicated by a solid line 18 are sampled at the sampling points (257)-(512). Referring to FIG. 3 sampling data S257-S384 of the first half of these sampling data is recorded on the third recording track T3 and sampling data S385-S512 in the latter half thereof is recorded on the fourth recording track T4.

The recorded still image is reproduced in a still image reproducing system shown in FIG. 1. Referring to FIG. 1, the still image reproducing system includes a rotary drum 3 having two magnetic heads 14 and 15, reproduced signal processing circuit 2 connected to the magnetic heads 14 and 15, a switch 3 for selectively outputting an output of the reproduced signal processing circuit 2 to either of two terminals 42 and 43, an oscillation circuit 5, switches 6 and 7 connected to the oscillation circuit 5 and the reproduced signal processing circuit 2, a first image memory 28 connected to an output of the switch 6 and the output terminal 42 of the switch 3, a second image memory 29 connected to an output of the switch 7 and the output terminal 43 of the switch 3, a switch 10 having input terminals 51 and 52 connected to outputs of the image memories 28 and 29, respectively, a D/A (digital-to-analog) converter 11 connected to an output of the switch 10, a control portion 24 connected to the reproduced signal processing circuit 2 and the switches 3, 6, 7 and 10, for controlling the respective switches 3, 6, 7 and 10.

The rotary drum 13 rotates, contacts the magnetic tape 1 travelling in a direction indicated by an arrow D1, and scans the magnetic tape by the magnetic heads 14 and 15. The magnetic heads 14 and 15 in turn scan the magnetic tape and reproduce signals on the successive tracks and supplies the same to the reproduced signal processing circuit 2.

The reproduced signal processing circuit 2 is for demodulating signals outputted from the magnetic heads 14 and 15, subjecting the demodulated signals to an error correcting processing, thereby supplying the corrected signal as reproduced signals d1 to an input terminal 41 of the switch 3, and outputting to the control portion 24 a flag signal FL1 indicating completion of a signal reading. In case the input signal is found to be defective, the circuit 2 applies an error flag EFL to the control portion 24. The reproduced signal processing circuit 2 also serves to output a first clock CK1 for determining a timing for signal processing.

The control portion 24, in response to the flag signal FL1, supplies a control pulse SW1 to the switches 3 and 6, a control pulse SW2 which is complementary to the control pulse SW1 to the switches 7 and 10 respectively, thereby controlling an operation of the entire still image reproducing system.

The oscillation circuit 5 has a frequency smaller than that of the first clock CK1 and outputs a second clock CK2 for determining an operation of the reproducing system.

The switch 3 has the input terminal 41 connected to the output of the reproduced signal processing circuit 2 and the output terminals 42 and 43 selectively connected to the input terminal 41 in response to the control pulse SW1. The terminals 42 and 43 are connected to the image memories 28 and 29, respectively. The switch 3 supplies the reproduced signal d1 as a signal d2 to the image memory 28 when the control pulse SW1 is at the high level and in other cases, supplies the reproduced signal d1 as a signal d3 to the image memory 29.

The switch 6 includes an input terminal 61 for receiving the first clock CK1, an input terminal 62 for receiving the second clock CK2 and an output terminal 63 selectively connected to the input terminals 61 and 62 in response to the control pulse SW1. The terminal 63 is connected to the image memory 28. The switch 6 supplies the first clock CK1 when the control pulse SW1 is at the high level, and in other cases, supplies the second clock CK2 as a clock CK3 to the image memory 28.

The switch 7 includes an input terminal 71 for receiving the first clock CK1, an input terminal 72 for receiving the second clock CK2 and an output terminal 73 selectively connected to the terminals 71 and 72 in response to the control pulse SW2. The terminal 73 is connected to the image memory 29. The switch 7 supplies the first clock CK1 when the control pulse SW2 is at the high level, and in other cases, supplies the second clock CK2 as a clock CK4 in to the image memory 29.

When the clock CK3 supplied from the switch 6 is the clock CK1, the image memory 28 stores the reproduced signal d2 applied from the switch 3, in synchronization with the clock CK1, and in other cases, outputs the stored contents as a signal d4 to the switch 10, in synchronization with the clock CK2.

When the clock CK4 supplied from the switch 7 is the clock CK1, the image memory 29 stores the reproduced signal d3 applied from the switch 3, in synchronization with the clock CK1, and in other cases, outputs stored contents as a signal d5 to the switch 10, in synchronization with the clock CK2.

The switch 10 includes the input terminals 51 and 52 connected to the outputs of the image memories 28 and 29, respectively, and an output terminal 53 selectively connected to the input terminals 51 and 52 in response to the control pulse SW2. The output terminal 53 is connected to the D/A converter 11. The switch 10 outputs the output signal d4 of the image memory 28 when the control pulse SW2 is at the low level and in other cases, outputs the output signal d5 of the image memory 29 as a reproduced signal d6, to the D/A converter 11.

The D/A converter 11 converts the digital reproduced signal d6 applied from the switch 10 into an analog signal and outputs a video signal.

Referring to FIGS. 1 to 3, a reproducing system of the conventional magnetic recording and reproducing apparatus operates as follows.

The signals of the two tracks (one field) read out by the magnetic heads 14 and 15 are inputted to the reproduced signal processing circuit 2. The reproduced signal processing circuit 2 demodulates signals and corrects errors by parity or the like. The reproduced signal processing circuit 2 applies the flag FL1 to the control portion 24 when the processing of one field is finished. The reproduced signal processing circuit 2 also applies the digital signal d1 which has been subjected to the above-described signal processing to the input terminal 41 of the switch 3.

The control portion 24 inverts the control pulses SW1 and SW2 every time the flag signal FL1 is inputted thereto. Description will be given in the following of a case where the control pulses SW1 and SW2 are at a high level and a low level respectively. The switch 3 connects the terminals 41 and 42. The switch 6 connects the terminals 61 and 63. The switch 7 connects the terminals 72 and 73. The switch 10 connects the terminals 52 and 53.

The digital signal d1 provided to the output terminal 42 is recorded as the signal d2 in the image memory 28 as the signal d2. On this occasion, the image memory 28 operates in synchronization with the clock CK1 applied from the reproduced signal processing circuit 2.

On this occasion, a clock CK4 applied to the image memory 29 from the switch 7 is the clock CK2 outputted by the oscillation circuit 5. The image memory 29 outputs the stored contents, that is, the image signal d5 recorded one field before, to the input terminal 52 of the switch 10 in synchronization with the clock CK2. Since the switch 10 connects the terminals 52 and 53, the reproduced signal d5 is applied from the output terminal 53 to the D/A converter 11 as the reproduced signal d6. The D/A converter 11 converts the applied digital reproduced signal d6 into an analog signal and outputs the same as a video signal.

After processing one field of the signals, the recorded signal processing circuit 2 again causes the flag signal FL1 to attain the low level, while the control pulses SW1 and SW2 are maintained at the original values. Since the clock CK2 has a frequency smaller than that of the clock CK1, reading of the reproduced signal d5 from the image memory 29 takes time longer than that required for processing one field of signals by the reproduced signal processing circuit 2.

Subsequently, the recorded signals in the subsequent two tracks are sequentially read out by the magnetic heads 14 and 15 and applied to the reproduced signal processing circuit 2. The reproduced signal processing circuit 2 performs the same signal processing as described above, outputs a reproduced signal to the switch 3 and causes the flag FL1 to attain the high level again. The control portion 24 inverts the values of the control pulses SW1 and SW2 in response to the flag FL1 attaining the high level. On this occasion, the switch 3 connects the terminals 41 and 43. The switch 6 connects the terminals 62 and 63. The switch 7 connects the terminals 71 and 73. The switch 10 connects the terminals 51 and 53. Accordingly, on this occasion, the reproduced signal d1 is stored in the image memory 29 through the switch 3. The image memory 28, in synchronization with the clock CK2 applied from the oscillation circuit 5, outputs the stored contents as a reproduced signal d4. The reproduced signal d4 is applied as the reproduced signal d6 to the D/A converter 11 through the switch 10. The D/A converter 11 converts the applied digital reproduced signal d6 into an analog signal and outputs the same as a video signal.

When writing of the reproduced signal into the image memory 29 and outputting the reproduced signal d4 from the image memory 28 are finished, the reproduced signal processing circuit 2 has already caused the flag signal FL1 to return to the low level. Finishing the signal processing of the subsequent track and starting to output the processed signals to the switch 3, the reproduced signal processing circuit 2 once again causes the flag FL1 to return to the high level. The control portion 24 again inverts control pulses SW1 and SW2 in response to the change of the flag FL1. As a result, the image memory 28 starts to store the reproduced signal again and the image memory 29 starts to output the stored contents.

As described above, one field of the outputs of the image memories 28 and that of the image memory 29 are alternately applied to the D/A converter 11. Accordingly, the image recorded on the magnetic tape 1 can be displayed by a display apparatus such as a CRT (Cathode-Ray Tube).

The DAT is capable of recording and reproducing not only audio signals but also video signals as described above. The DAT can be used in an extremely wide field. In addition, since the DAT is capable of recording information on a tape in a digital manner, a so-called "search mode" can be provided. In the search mode, recorded contents in a recording portion can be directly located and reproduced by designating a particular position of the tape and fast forwarding the tape to the designated position. As a result, desired information can be obtained quickly. Therefore, the DAT can be used in an extremely wide field not limited to recording of music.

However, in the above-described conventional magnetic recording and reproducing apparatus, a long search time is required in a search mode. In a conventional apparatus, about five seconds is required for outputting one frame of image data. Five seconds are considered to be a very long time especially for a person who wants to obtain specific information rapidly. Therefore, it is impossible to make full use of the advantage in the search mode.

SUMMARY OF THE INVENTION

Therefore, an object of the present invention is to provide a magnetic recording/reproducing apparatus in which a time period required for searching can be made short in order to resolve the above described problem.

According to one aspect of the present invention, the magnetic recording apparatus includes an A/D (analog-to-digital) converter, a signal dividing circuit, a signal permuting circuit and a magnetic head. The A/D converter is for converting a signal of a plurality of channels into a digital signal having a predetermined number of bits. The signal dividing circuit is for dividing the signal of a plurality of channels converted into the digital signal by the A/D converter into signals of a higher bit group and a lower bit group. The signal permuting circuit is for permuting the signals of the higher bit group and the lower bit group such that a group of the higher bit group and a signal of the lower bit signal of the same channel are recorded on different tracks, respectively. The magnetic head is for recording the permuted signals of the higher bit group and the lower bit group on the different tracks, respectively, on magnetic recording media.

According to another aspect of the present invention, the magnetic reproducing apparatus includes a magnetic head, a signal reproducing circuit and a D/A converter. The magnetic head is for individually reproducing first digital signals recorded on a first track and second digital signals recorded on a second track. The signal generating circuit is for generating digital signals having a third number of bits different from the first and the second bit numbers, based on the reproduced first and second digital signals. The D/A converter is for converting the generated digital signals having the third number of bits into analog signals.

Audio signals are converted into digital signals by an A/D converter. The converted digital signals are divided into signals of higher bit group and signals of lower bit group by a signal dividing circuit. The divided signals of the higher bit group and the lower bit group are permuted so as to be recorded on different tracks by a signal permuting circuit. The permuted signals of the higher bit group and the lower bit group are recorded on the different tracks on the magnetic recording medium by the magnetic head.

The recorded signals are reproduced as follows. The magnetic head of the magnetic reproducing apparatus individually reproduces the first and the second digital signals respectively recorded on the different tracks. The signal generating circuit generates digital signals having the third number of bits, based on the first and the second digital signals. The generated digital signal having the third number of bits is converted by the D/A converter. Accordingly, by recording the above-described signals of the higher bit group as the first digital signals and the signals of the lower bit group as the second digital signals, the magnetic reproducing apparatus is capable of reproducing the necessary information out of the original audio signals and supplying the same as analog signals to the external elements.

The signal generating circuit generates digital signals having the third number of bits from the signals of the higher bit group and the lower bit group. In this case, the signal generating circuit is capable of generating a signal by using, for example, only the data necessary and sufficient for the search. Therefore, both of the first and the second digital signals are not always needed to be processed. As a result, by omitting the processings, outline of the necessary information can be obtained as an analog signal in a short time period. In addition, one signal is divided and each recorded on a plurality of tracks, so that it is possible to diversify the processings in the reproduction.

According to a preferred embodiment of the present invention, the signal generating circuit includes an array circuit for outputting digital signals having the third number of bits by alternately arraying the first digital signals and the second digital signals. According to another preferred embodiment of the present invention, the signal generating circuit further includes a bit number converting circuit for converting the number of bits of the first digital signals into the third number of bits. According to a further preferred embodiment of the present invention, the signal generating circuit further includes a selection circuit for selecting either output of the arraying circuit or the output of the bit number converting circuit and for supplying the selected output to the D/A converter.

The arraying circuit allows all the information included in the first and the second digital signals to be included in the digital signals having the third number of bits, whereby it becomes possible to reproduce the information recorded on the magnetic recording medium with high-fidelity. In addition, the bit number converting circuit enables obtaining the digital signals having the third number of bits from the first digital signals only, so that it becomes possible to omit the processing for the second digital signals. Therefore, it becomes possible to reproduce the information at a high speed while including, for example, the information necessary and sufficient for the search. The selection circuit enables selection of a reproduction mode for reproducing the original information with fidelity, though at a low speed and a mode for reproducing the information at a high speed, by using only the data necessary and sufficient for the search.

According to a further aspect of the present invention, the magnetic recording and reproducing apparatus includes an A/D converter, a signal dividing circuit, a signal permuting circuit, a magnetic head, a signal generating circuit and a D/A converter.

The A/D converter is for converting analog video signals of a plurality of channels into digital signals having the predetermined number of bits. The signal dividing circuit is for dividing the converted digital signals into the first and second digital signals having predetermined the first and second numbers of bits respectively for each channel. The signal permuting circuit is for permuting the first and second digital signals of the same channel so as to be recorded on different tracks respectively. The magnetic head is for recording the permuted first and second digital signals on the different tracks on the magnetic recording medium and for individually reproducing the first and second digital signals recorded on the different tracks. The signal generating circuit is for generating digital signals having a predetermined third number of bits, based on the reproduced first and second digital signals. The D/A converter converts the digital signals outputted from the signal generating circuit into analog signals and outputs the same.

In the above-described magnetic recording and reproducing apparatus, the signals of the plurality of channels are divided into the first and second digital signals for each channel, and the divided signals are recorded on the separate tracks. The recorded first and second digital signals are individually reproduced. The digital signals having the third number of bits are reproduced based on the individually reproduced first and second digital signals. On this occasion, it is possible to generate digital signals including all the information included in the first and second digital signals and to generate digital signals including only the minimum data required. Therefore, it is both possible to reproduce the whole information at a low speed, and to reproduce at a high speed only the minimum information required for confirming the contents of the information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6(a)-(m) are wave form diagrams showing operations of the magnetic recording and reproducing apparatus.

FIGS. 6A(1)-(7) are wave form diagrams showing reproducing operations of the apparatus according to the present invention.

FIGS. 10A-10E are schematic illustrations of the reproduced images showing operations of the magnetic recording and reproducing apparatus according to the present invention.

DESCRIPTION OF THE PREFERRED EMBODIMENTS

A magnetic recording and reproducing apparatus according to one embodiment of the present invention will be described in the following with reference to the drawings. In the present embodiment, referring to FIG. 9, a first recording track T1 of the magnetic tape 1 records higher bits of digital data of video signals in the first field. A second recording track T2 records lower bits thereof. A third recording track T3 records higher bits of digital data of video signals in the second field. A fourth recording track T4 records lower bits thereof.

Figure 2:
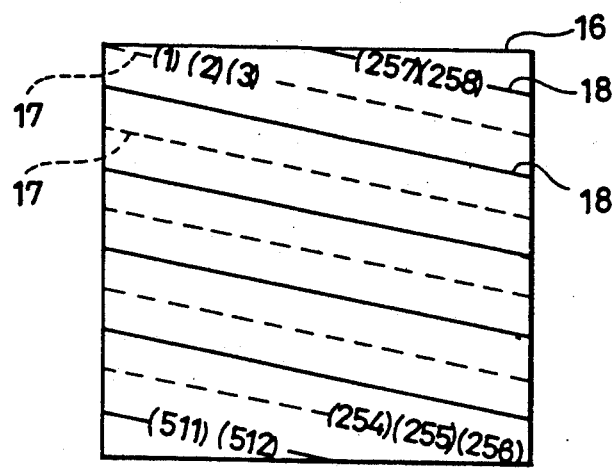
FIG. 2 is a schematic illustration of one frame of an image.
Figure 3:
FIG. 3 is a schematic illustration showing an arrangement of tracks on a magnetic tape.

Referring to FIG. 2, it is assumed that the video signals are sampled, for example, at 256 sampling points (1), (2), (3), . . . (much more in practice) in each field. Assuming that digital data at each sampling point is represented by 8 bits, each of the higher bit group and the lower bit group includes 4 bits. The bit number is not limited to this. For example, if the sample data has 16 bits, each of the higher bit and the lower bit groups includes 8 bits.

Figure 8:
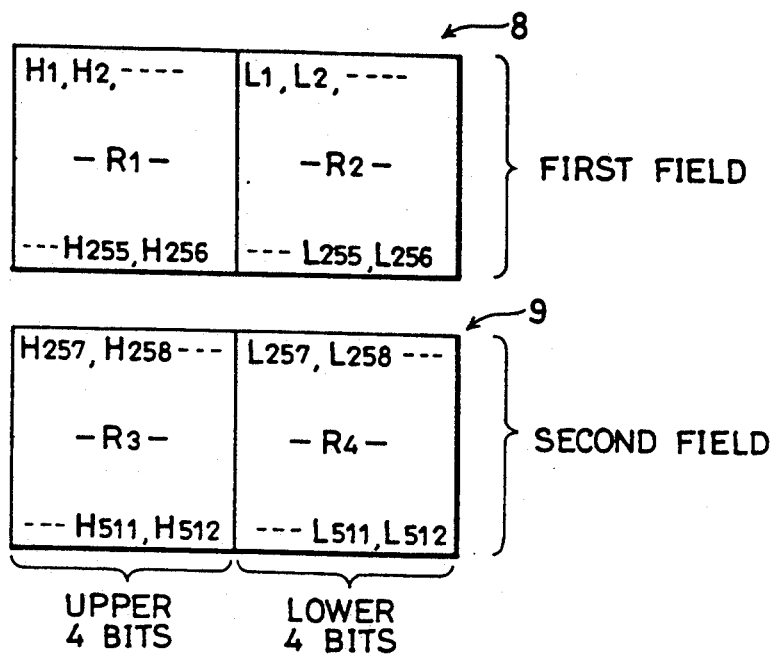
FIG. 8 is a schematic illustration showing a manner of information storage by image memories.

FIG. 8 is a schematic illustration of a data map of an image memory which will be described later. Higher bit data in the first field is stored in a region R1 of the image memory and lower bit data is stored in a region R2. Higher bit data in the second field is stored in a region R3 and lower bit data is stored in a region R4. The higher bits in the 512 sample data in the two fields are stored in addresses H1-H512 and the lower bit data is stored in the addresses L1-L512.

Figure 4:
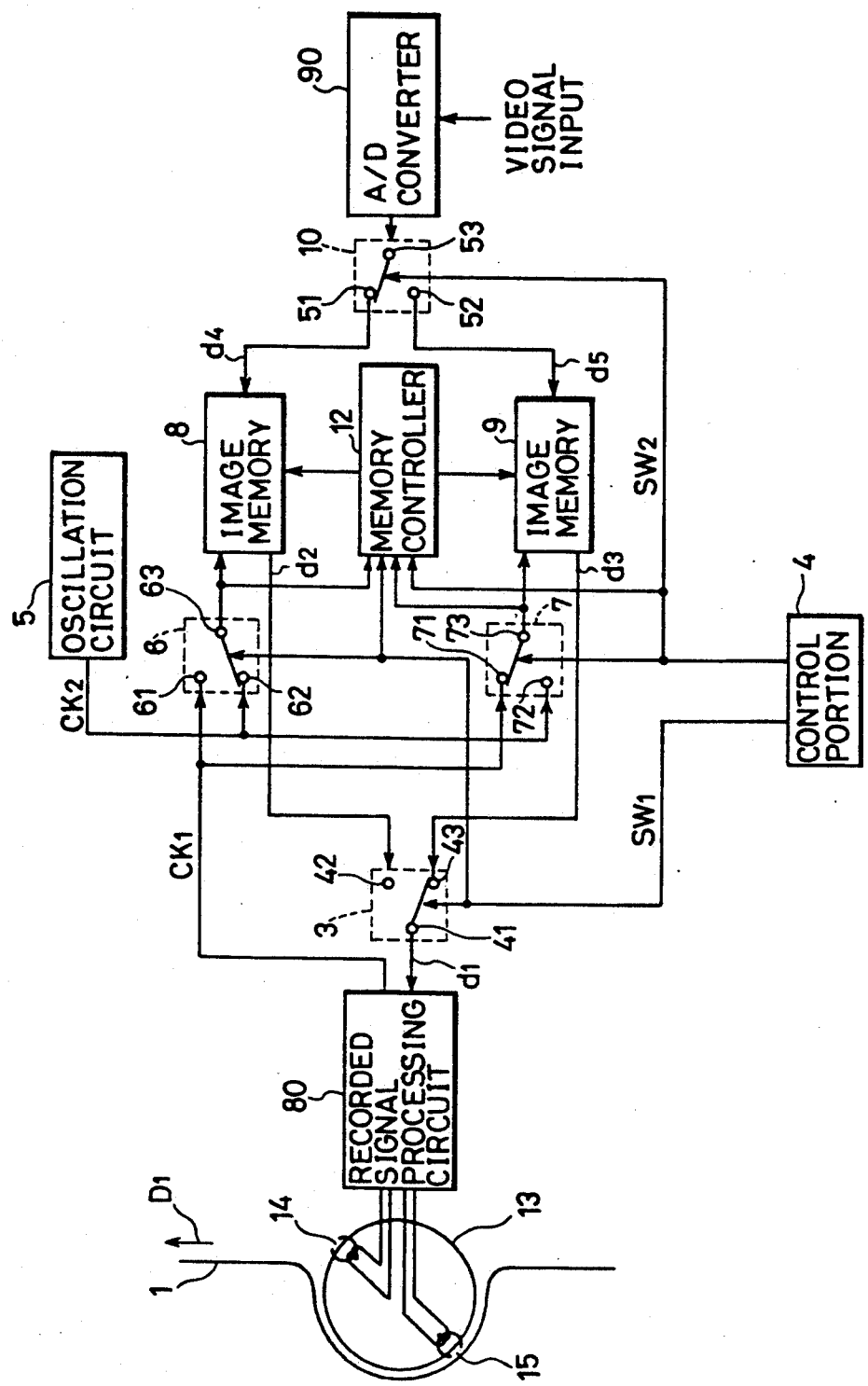
FIG. 4 is a block diagram of a recording system of the magnetic recording and reproducing apparatus according to the present invention.

Referring to FIG. 4, an image recording system of the image recording and reproducing apparatus according to the present embodiment includes an A/D converter 90 for receiving analog video signals and for converting the same into digital signals, a switch 10 for receiving an output of the A/D converter 90 and for selectively outputting the same to output terminals 51 or 52 in response to an externally applied control pulse SW2, image memories 8 and 9 connected to the terminal 51 of the switch 10 for dividing signals in the first field of the video signals converted into digital values into a higher bit group and a lower bit group, for storing the same in the separate regions and for outputting the same, a memory controller 12 for controlling the image memories 8 and 9 to individually record the higher bit group and the lower bit group of the video signals in the first and the second fields respectively, an oscillation circuit 5 for outputting a clock CK2, a rotary drum 13 having magnetic heads 14 and 15 for scanning the magnetic tape 1 travelling in a direction indicated by an arrow D1 to record video signals thereon, a recorded signal processing circuit 80 for supplying signals to be recorded to the rotary drum 13 and for outputting a clock CK1 for determining an operation timing of the system, a switch 6 connected to the oscillation circuit 5 and the recorded signal processing circuit 80 for selectively applying the clocks CK1 or CK2 to the image memory 8 and the memory controller 12 in response to an externally applied control pulse SW1, a switch 7 connected to the oscillation circuit 5 and the recorded signal processing circuit 80 for selectively applying the clocks CK1 or CK2 to the image memory 9 and the memory controller 12 in response to the externally applied control pulse SW2, and a switch 3 connected to the image memories 8 and 9 for selectively applying output of the image memories 8 or 9 to the recorded signal processing circuit 80 in response to the externally applied control pulse SW1.

Figure 1:
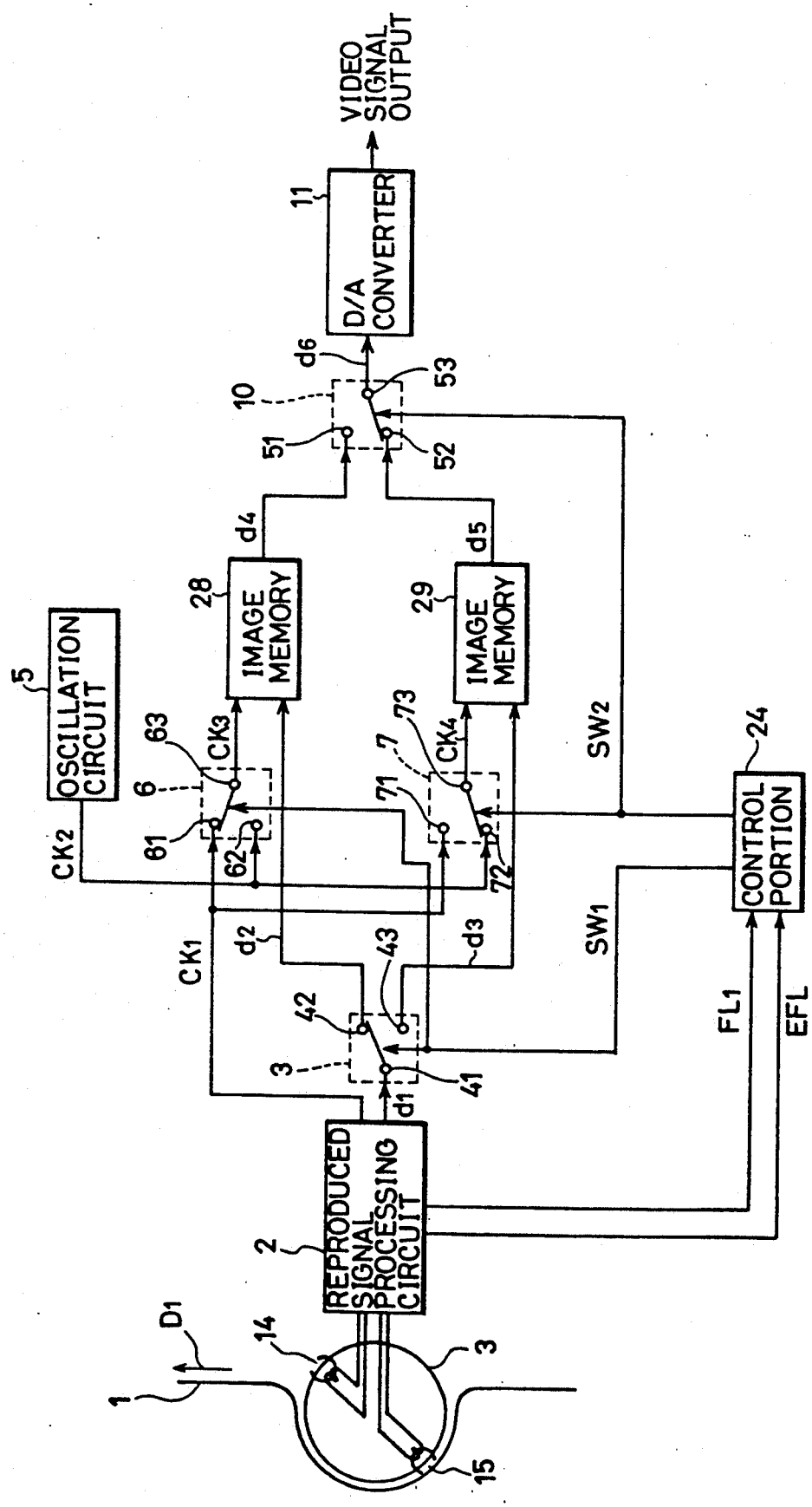
FIG. 1 is a block diagram of a still image reproducing system of a conventional magnetic recording and reproducing apparatus.

In the video signal recording system shown in FIG. 4, the same reference numerals and names are given to the same or the corresponding portions to the respective portions shown in FIG. 1.

Figure 4A:
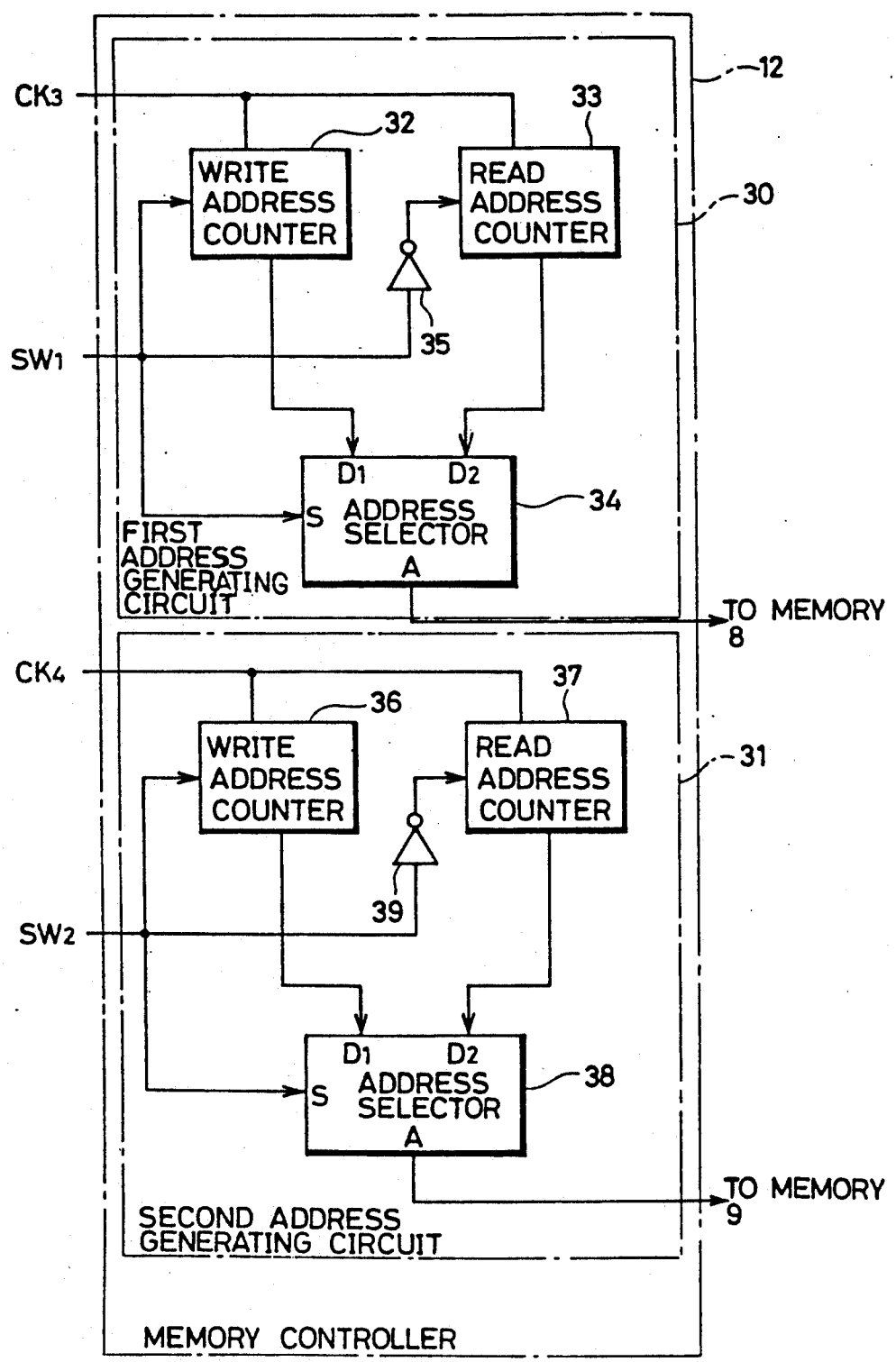
FIG. 4A is a block diagram of a memory controller

Referring to FIG. 4A, the memory controller 12 includes a first address generating circuit 30 receiving the clock CK3 and the control pulse SW1 for generating addresses of the memory 8, and a second address generating circuit 31 receiving the clock CK4 and the control pulse SW2 for generating addresses of the memory 9.

The first address generating circuit 30 includes a write address counter 32 for receiving the clock CK3 and the control pulse SW2, for counting the clock CK3 when the control pulse SW1 attains the high level, and for outputting a value thereof, a read address counter 33 for receiving the clock CK3 and an inversion signal of the control pulse SW1 for counting the clock CK3 when the control pulse SW1 attains the low level and for outputting a value thereof, an inverter 35 for supplying an inversion of the control pulse SW1 to the read address counter 33, and an address selector 34 for receiving the control pulse SW1, and outputs of the write address counter 32 and the read address counter 33 and for outputting an address signal of the memory 8.

The second address generating circuit 31 includes a write address counter 36 for receiving the clock CK4 and the control pulse SW2, for counting the clock CK4 when the control pulse SW2 attains the high level, and for outputting a value thereof, a read address counter 37 for receiving the clock CK4 and an inversion signal of the control pulse SW2 for counting the clock CK4 when the control pulse SW2 attains the low level, and for outputting a value thereof, an inverter 39 for supplying an inversion of the control pulse SW2 to the read address counter 37, and an address selector 38 for receiving the control pulse SW2 and outputs of the write address counter 36 and the read address counter 37, and for outputting an address signal of the image memory 9.

Figure 4B:
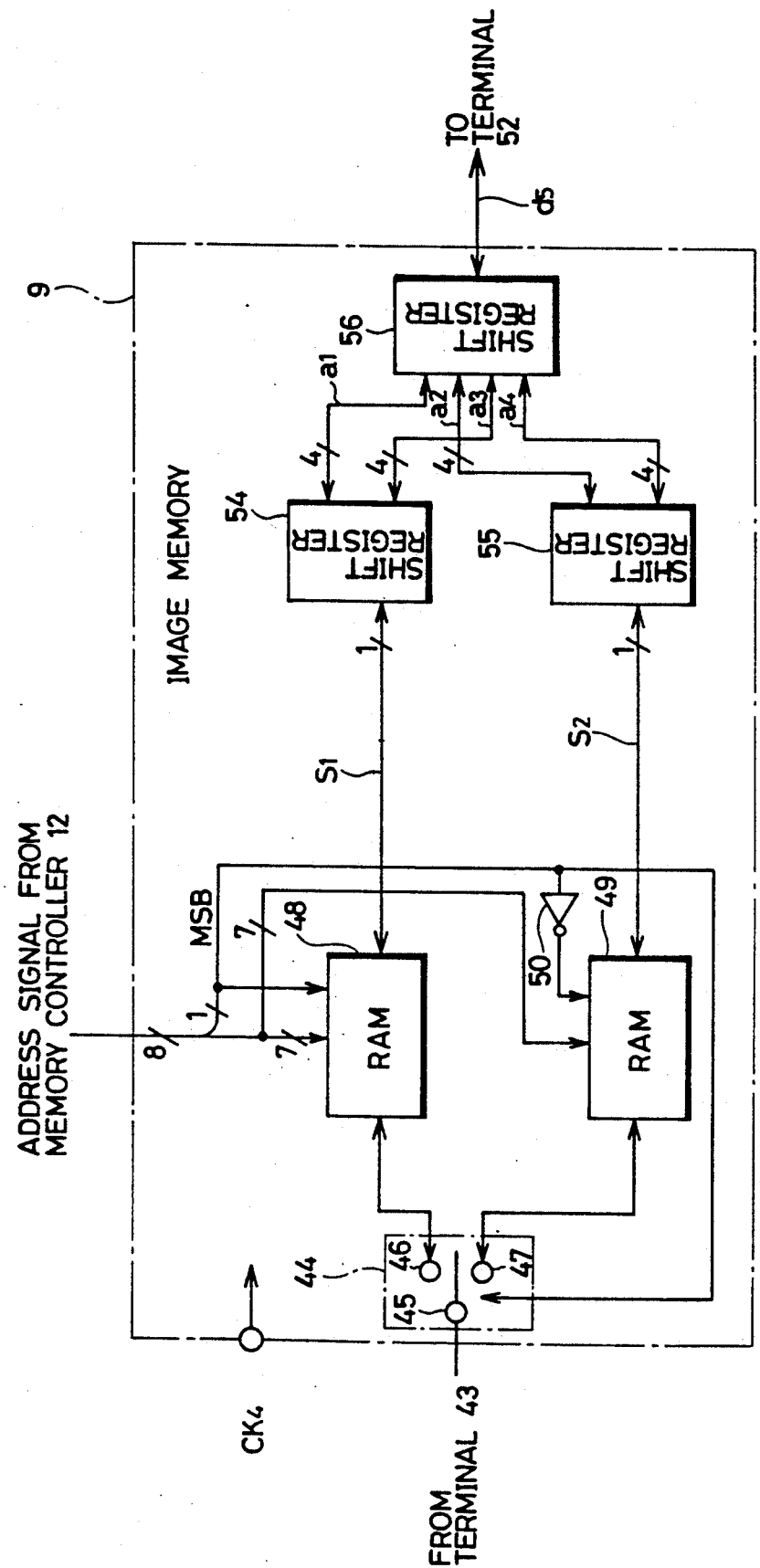
FIG. 4B is a block diagram of an image memory.

Referring to FIG. 4B, for example, the image memory 9 includes a switch 44 having a common terminal 45 connected to the terminal 43 and two terminals 46 and 47, two RAMs (Random Access Memory) 48 and 49 each connected to the terminal 46 and the memory controller 12, shift registers 54 and 55 connected to the RAMs 48 and 49, respectively, a shift register 56 connected to the shift registers 54 and 55 and the terminal 52, for dividing a serial digital signal S3 having 16 bits inputted from the terminal 52 into partial bit strings a1-a4 each having 4 bits and for supplying the partial bit strings a1 and a3 to the shift register 54 and the partial bit strings a2 and a4 to the shift register 55, respectively, and for performing a reverse conversion, and an inverter 50 for inverting the most significant bit (referred to as "MSB" hereinafter) of the address signal applied from the memory controller 12 and supplying the inverted signal to the RAM 49. The RAMs 48 and 49 correspond to the regions R3 and R4 shown in FIG. 8, respectively.

The MSB of the 8-bit address signal applied from the memory controller 12 is supplied to the RAM 48 and the switch 44. The MSB inverted by the inverter 50 is applied to the RAM 49. The lower 7 bits of the address signal from the memory controller 12 are applied to the RAMs 48 and 49 to select the addresses of the respective memories.

Referring to FIG. 4, the video signal recording system operates as follows. The A/D converter 90 converts externally applied analog video signals into digital 10 signals of 8 bits, for example, and applies the digital signal to an input terminal 53 of the switch 10.

A control portion 4 outputs the control pulse SW1 which alternately attains a high level and a low level for every field and the control pulse SW2 complementary to the control pulse SW1, in synchronization with the video signal applied to the A/D converter 90.

It is assumed now that the control pulses SW1 and SW2 are at the low level and the high level, respectively. The switch 3 connects terminals 41 and 43. The switch 6 connects terminals 62 and 63. The switch 7 connects terminals 71 and 73. The switch 10 connects the terminals 51 and 53.

The digital signal outputted from the A/D converter 90 is applied to the image memory 8 through the switch 10. The oscillation circuit 5 applies the clock CK2 to the image memory 8 and the memory controller 12 through the switch 6. The recorded signal processing circuit 80 applies the clock CK1 to the image memory 9 and the memory controller 12 through the switch 7.

The memory controller 12 controls the image memory 8 and causes the same to divide the digital signals applied to the image memory 8 into higher 4 bits and lower 4 bits and to store the same into the separate addresses. The image memory 8 individually stores the higher 4 bits of the digital signal in successive addresses and the lower 4 bits in other successive addresses in accordance with the control of the memory controller 12. The higher 4-bit data is stored in, for example, a region R1 shown in FIG. 8 and the lower 4-bit data is stored in a region R2.

The memory controller 12 also controls the image memory 9 and causes the same to sequentially output the higher 4-bit signals previously stored in the image memory 9.

Data output from the image memory 9 to the terminal 43 is executed as follows. As in the data writing, the address signals are applied to the RAMs 48 and 49 from the memory controller 12. When the MSB is a logical 1, the RAM 48 sequentially applies to the terminal 46 the contents stored in the designated addresses. The switch 44 connects the terminals 45 and 46 in response to the MSB being the logical 1. Accordingly, the output of the RAM 48 is applied to the terminal 43. When the MSB is the logical 0, the switch 44, to the contrary, connects the terminals 45 and 47. The value of the MSB is inverted by the inverter 50 and applied to the RAM 49. The RAM 49 sequentially applies the contents stored in the addresses designated by the lower 7 bits of the address signal to the terminal 47. Accordingly, the stored contents in the RAM 49 is sequentially applied to the terminal 43. The data reading from the image memory 9 is executed as described above.

The higher 4-bit signals outputted from the image 9 are applied to the recorded signal processing circuit 80 through the switch 3 and recorded on the first track on the magnetic tape 1 by the magnetic heads 14 and 15. When the data output of the higher 4 bits is finished, the memory controller 12 controls the image memory 9, and causes the same to sequentially output the lower 4-bit signals to the recorded signal processing circuit 80. The recorded signal processing circuit 80 applies the signals provided from the image memory 9 to either the magnetic head 14 or 15 and records the same on the subsequent second track.

Referring to FIG. 4A, described in detail, the memory controller 12 operates as follows. When the control pulse SW1 is at the high level, the write address counter 32 counts the clock CK3 and supplies the value thereof to the address selector 34. When the control pulse SW1 is at the high level, the address selector 34 selects the storing address of the memory 8, based on the data inputted from the write address counter 32, and supplies address signals to the memory 8.

When the control pulse SW1 attains the low level, the read address counter 33 replaces the write address counter 32 and starts to count the clock CK3. The read address counter 33 applies the counted value to the address selector 34. When the control pulse SW1 is at the low level, the address selector 34 selects the reading address o the memory 8, based on the data applied from the read address counter 33 and supplies address signals to the memory 8.

The second address generating circuit 31 operates as follows. When the control pulse SW2 is at the high level, the write address counter 36 counts the clock CK4 and supplies a value thereof to the address selector 38. The address selector 38, when the control pulse SW2 is at the high level, selects storing addresses of the memory 9, based on the value inputted from the write address counter 36 and supplies address signals to the memory 9.

When the control pulse SW2 is at the low level, the read address counter 37 replaces the write address counter 36 and starts counting the clock CK4. The read address counter 37 applies the counted value to the address selector 38. The address selector 38, when the control pulse SW2 is at the low level, selects reading addresses of the memory 9, based on the data applied from the read address counter 37, and supplies address signals to the memory 9.

When the video signals applied to the A/D converter 90 are switched to the next field, the control portion 4 inverts the control pulses SW1 and SW2. The switch 3 connects the terminals 41 and 42. The switch 6 connects the terminals 61 and 63. The switch 7 connects the terminals 72 and 73. The switch 10 connects the terminals 52 and 53.

The image memory 9 receives digital signals from the A/D converter 90 through the switch 10. The image memory 9 also receives the clock CK2 from the oscillation circuit 5 through the switch 7. The image memory 9 is controlled by the memory controller 12, is caused to divide the digital signals applied from the A/D converter 90 into two signals of higher 4 bits and lower 4 bits and stores the same into the separate addresses. Referring to FIG. 8, the image memory 9 stores the higher 4-bit signals in the region R3 (RAM 48) and the lower 4-bits in the region R4 (RAM 49).

Figure 4C:
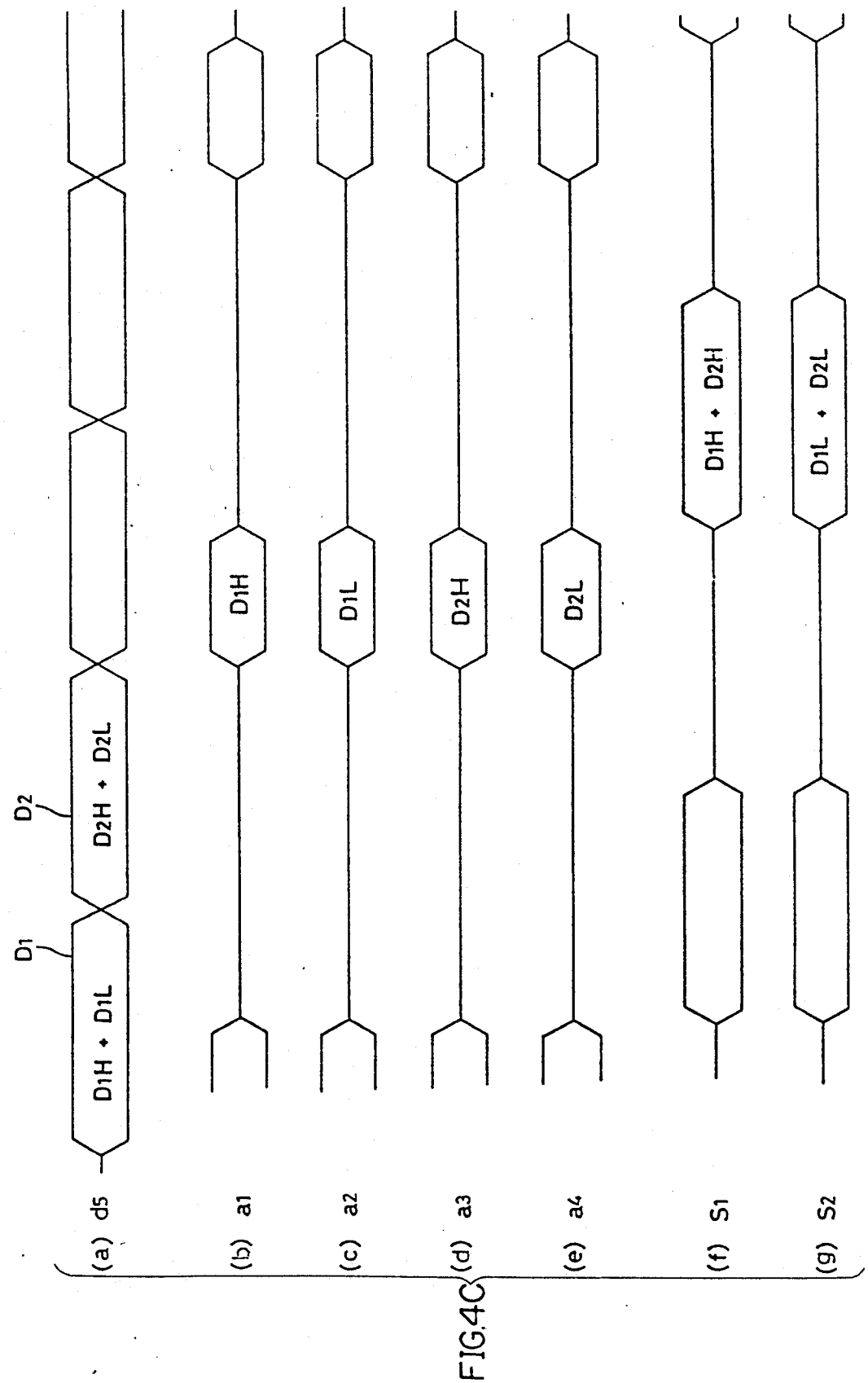
FIGS. 4C (a)-(g) are wave form diagrams showing operations of the magnetic recording and reproducing apparatus according to the present invention.

Referring to FIGS. 4B and 4C, the image memory 9 operates as follows. The clock CK4 is applied to the image memory 9. The clock CK4 controls an entire operation of the image memory 9. Digital signals d5 from the terminal 52 are serially applied to the shift register 56. The shift register 56 loads 16 bits of the digital signal d5. The shift register 56 divides the loaded 16-bit signals into partial bit strings a1–a4 each having 4 bits. The shift register 56 applies the partial bit strings a1 and a3 to the shift register 54 and the partial bit strings a2 and a4 to the shift register 55 in parallel. The partial bit string a1 includes higher 4 bits of the preceding 8-bit digital signal d5 and the partial bit string a2 includes the lower 4 bits thereof. The partial bit string a3 includes higher 4 bits of the subsequent 8 bits and the partial bit string a4 includes lower 4 bits thereof.

The shift register 54 loads the partial bit strings a1 and a2 and applies the same as 8-bit serial signals S1 to the RAM 48. At the same time, the shift register 55 loads the partial bit strings a2 and a4 and applies the same as 8-bit serial signals S2 to the RAM 49.

The address signal MSB applied from the memory controller 12 is inverted for every byte (8 bits) of the digital signal d5. The lower 7 bits of the address signal from the memory controller 12 indicate the storing addresses in the RAMs 48 and 49. When the MSB is a logical 1, the RAM 48 sequentially stores the successive signals S1 in the designated address. The RAM 49 stores the serial signals S2 in the designated addresses when the MSB is a logical 0. When the serial signals S1 and S2 are stored in the RAMs 48 and 49, the writing of the image signals to the image memory 9 is completed.

Referring to FIG. 4C, a process is described in which the digital signals d5 are stored in the RAMs 48 and 49. The digital signal d5 includes successive bit strings D1 and D2 each having 8 bits. The bit strings D1 and D2 are successively applied to the shift register 56. The bit string D1 includes a higher bit string D1H and a lower bit string D1L each having 4 bits. The bit string D2 includes higher bit strings D2H and D2L each having 4 bits.

The shift register 56 loads 16 bits of the bit strings D1 and D2 in this order. The shift register 56, after loading the bit strings D1 and D2, outputs in parallel the first higher bit string D1H as the partial bit string a1, the first lower bit string D1L as the partial bit string a2, the second higher bit string D2H as the partial bit string a3 and the second lower bit string D2L as the partial bit string a4. The partial bit strings a1 and a3 are applied to the shift register 54. The partial bit strings a2 and a4 are applied to the shift register 55.

The shift register 54, after storing the partial bit strings a1 and a3, sequentially outputs the 8-bit digital signal S1 including the bit strings a1 and a3 arrayed in this order. The digital signal S1 includes the first higher bit string D1H and the second higher bit string D2H. The shift register 55 stores the partial bit strings a2 and a4 in this order. The shift register 55 serially applies the 8-bit string including the stored bit strings a2 and a4 to the RAM 49 as the digital signal S2. The digital signal S2 includes the first lower bit string D1L and the second lower bit string D2L.

As the foregoing, the RAMs 48 and 49 store signals including the higher bit strings D1H and D2H, and the lower bit strings D1L and D2L, respectively.

The RAMs 48 and 49 outputs the stored digital signals S1 and S2 without modification at the time of the reading of the data to the terminals 46 and 47.

The operation of the memory controller 12 is completely the same as that in the signal recording. Accordingly, no further detailed description will be given here.

In the mean time, the image memory 8 receives the clock CK1 from the recorded signal processing circuit 80 through the switch 6. The image memory 8 outputs the higher 4-bit signals stored in the previous operation, in accordance with the control by the memory controller 12. The outputted higher 4-bit signals are applied to the recorded signal processing circuit 80 through the switch 3. The recorded signal processing circuit 80 applies the signals to either magnetic head 14 or 15, whereby the signal is recorded on one track of the magnetic tape.

When the higher 4-bit signal output is finished, the image memory 8 applies the lower 4-bit signals to the recorded signal processing circuit 80 in accordance with the control by the memory controller 12. The recorded signal processing circuit 80 records the lower 4-bit signals on other tracks of the magnetic tape 1 by using either the magnetic head 14 or 15.

The control portion 4 inverts the control pulse signals SW1 and SW2 in response to alternation of the respective fields of the video signal. As a result, the image memories 8 and 9 alternately store, outputs and applies the image signal to the recorded signal processing circuit 80.

Figure 9:
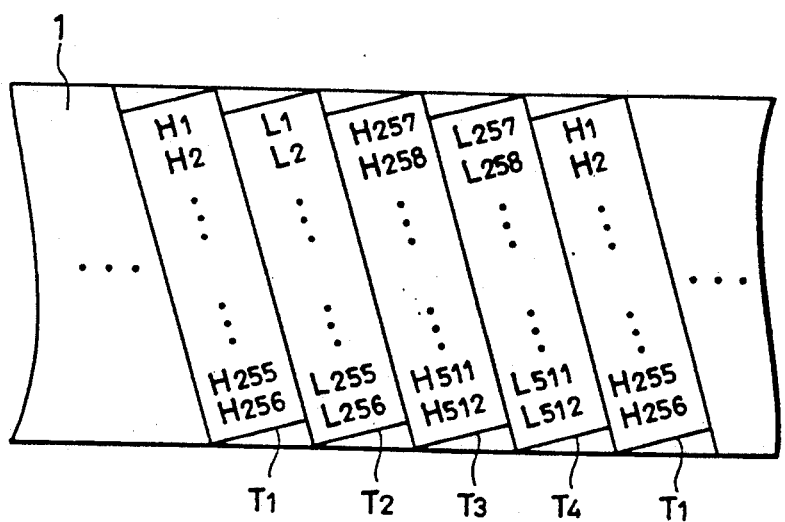
FIG. 9 is a schematic illustration of tracks on the magnetic tape according to the present invention.

Referring to FIG. 9, the higher 4-bit signals H1-H256 of the first to 256th sampling points shown in FIG. 2 are recorded on the first recording track T1 on the magnetic tape 1 by the recorded signal processing circuit 80 and the magnetic head 14 or 15. The lower 4-bit signals L1-L256 of the first to the 256th sampling points are recorded on the second recording track T2. The signals H257-H512 of the higher bits at the 257th-512th sampling points in the second field are recorded on the third recording track T3. The signals L257-L512 of the lower 4 bits at the 257th-512th sampling points are recorded on the fourth recording track T4. Thus, the higher 4 bits and the lower 4 bits of the signals in the two fields are individually recorded on the 4 tracks T1-T4.

Figure 5:
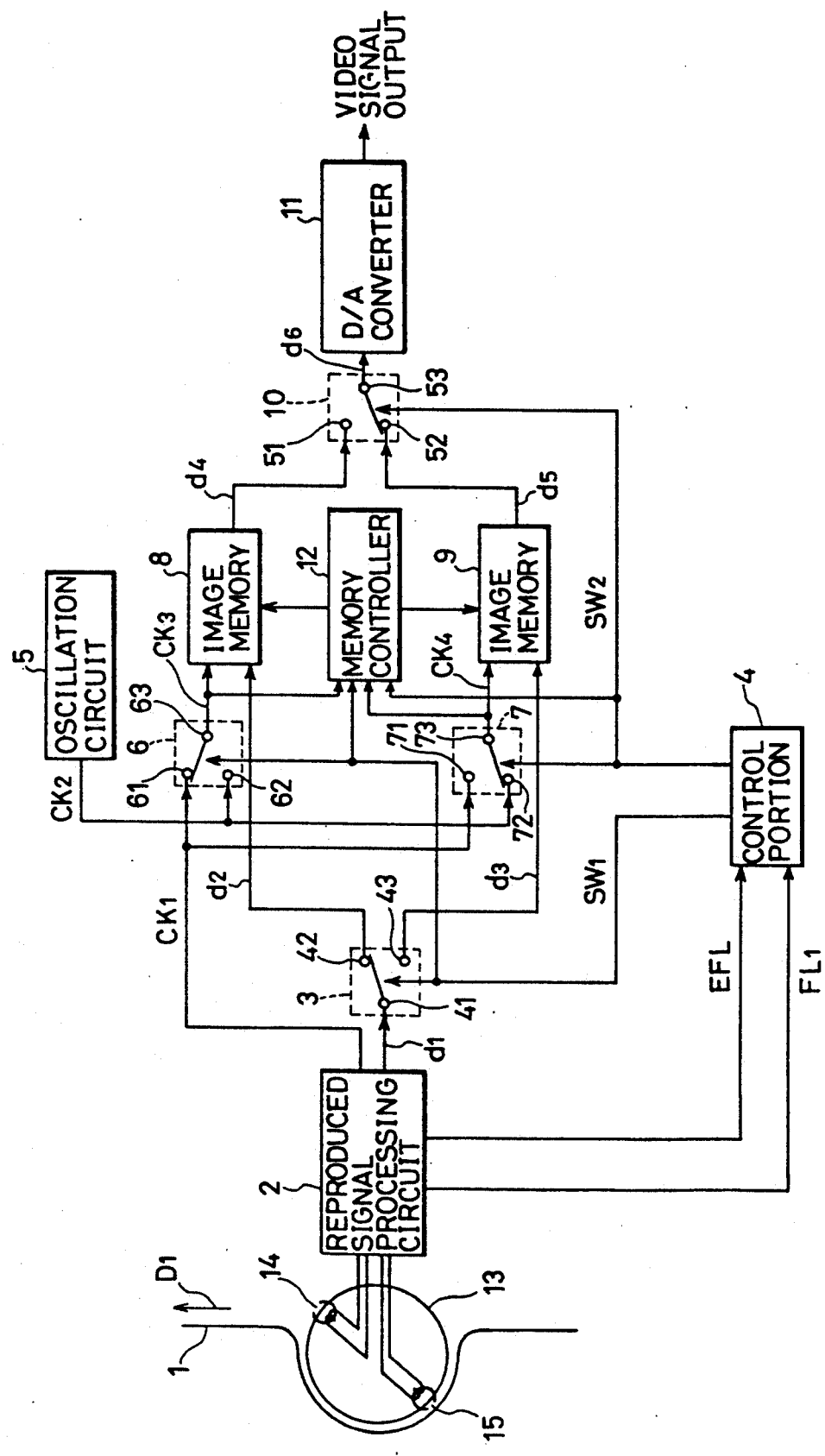
FIG. 5 is a block diagram of a still image reproducing system of the magnetic recording and reproducing apparatus according to the present invention

FIG. 5 is a block diagram of a video signal reproducing system of the magnetic recording and reproducing apparatus according to the present embodiment. Referring to FIG. 5, the video signal reproducing system differs from the signal recording system shown in FIG. 4 in that it includes a reproduced signal processing circuit 2 in place of the recorded signal processing circuit 80 and a D/A converter 11 in place of the A/D converter 90 and that a direction in which the video signal proceeds is reverse to that shown in FIG. 4. In FIG. 5, the same reference numerals and names are allotted to the same or the corresponding portions to those shown in FIG. 4. The functions thereof are also the same. Accordingly, detailed description thereof will not be repeated here.

The reproduced signal processing circuit 2 is for processing signals reproduced from the tape 1 which travels in the direction indicated by the arrow D1 by means of the magnetic heads 14 and 15, subjecting the signals to such processings as demodulation and error correcting, for applying the processed signals to the input terminal 41 of the switch 3 as reproduced signals d1, and for outputting the clock CK1 for determining an operation timing of the video signal reproducing system. The reproduced signal processing circuit 2 also outputs the error flag EFL to the control portion 4 in case it detects uncorrectable error in the error correcting process. The reproduced signal processing circuit 2 also applies the high level flag signal FL1 to the control portion 4 when processing the signals reproduced by the magnetic heads 14 and 15 and outputting the processed signals as reproduced signals d1, and causes the flag signal FL1 to attain the low level when outputting the reproduced signals d1 is finished.

Referring to FIG. 5, an operation of the video signal reproducing system will be described. The magnetic heads 14 and 15 reproduces recorded signals from the separate recording tracks on the tape 1 travelling in the direction of the arrow D1 and applies the reproduced signals to the reproduced signal processing circuit 2. The reproduced signal processing circuit 2 subjects the signals to the demodulation processing and the error correcting processing and applies the processed signals as the reproduced signals d1 to the input terminal 41 of the switch 3. In outputting the reproduced signals d1, the reproduced signal processing circuit 2 causes the flag signal FL1 to attain the high level, and when the reproduced signal d1 output is finished, the reproduced signal processing circuit 2 returns the flag signal FL1 to the low level.

Now it is assumed that the control pulses SW1 and SW2 are at the high level and the low level, respectively. The switch 3 connects the terminals 41 and 42. The switch 6 connects the terminals 61 and 63. The switch 7 connects the terminals 72 and 73. The switch 10 connects the terminals 52 and 53.

The switch 3 applies the reproduced signal d1 inputted from the reproduced signal processing circuit 2 to the image memory 8 as the reproduced signal d2.

The switch 6 applies the clock CK1 outputted from the reproduced signal processing circuit 2 to the image memory 8 as the clock CK3.

The switch 7 applies the clock CK2 outputted from the oscillation circuit 5 to the image memory 9 as the clock CK4.

The image memory 8, in response to the clock CK3 and controlled by the memory controller 12, stores the reproduced signal d2 sequentially in the successive addresses. As in the foregoing, the video signals recorded on the tape 1 are outputted from the reproduced signal processing circuit 2 in the order of the signals of the higher 4 bits and the lower 4 bits in the same field. Accordingly, the image memory 8 stores the higher 4-bit signals in one region and the lower 4-bit signals in other region. That is, referring to FIG. 8, the higher 4-bit signals and the lower 4-bit signals are stored in the regions R1 and R2, respectively.

Signals obtained by reading the proceeding two tracks are stored in the regions R3 and R4 of the image memory 9.

Referring to FIG. 6A, the following describes a process of data output from the image memory 9 to the D/A converter 11 after the data is stored in the RAMs 48 and 49. The RAM 48, in response to the clock CK4 and the MSB of the address signal from the memory controller 12, serially outputs the 8-bit digital signal S1 from the address designated by the lower 7 bits of the address signal from the memory controller 12 to the shift register 54. The 8 bits of the digital signal S1 include the first higher bit string D1H and the second higher bit string D2H.

The shift register 54 loads the digital signal S1 and divides the same into the partial bit strings a1 and a3 each having 4 bits and applies the same in parallel to the shift register 56. The shift register 56 stores the partial bit strings a1 and a3.

The RAM 49, in response to the clock CK4 and the inverted MSB of the address signal from the memory controller 12, serially outputs the digital signal S2 from the address designated by the lower 7 bits of the address signal and applies the same to the shift register 55. The shift register 55 loads the digital signal S2 and divides the same into the partial bit strings a2 and a4 each having 4 bits. The partial bit string a2 includes the first lower bit string D1L. The partial bit string a4 includes the second lower bit string D2L. Both of the partial bit strings a2 and a4 are applied to the shift register 56.

The shift register 56 stores the partial bit strings a2 and a4. On this occasion, each bit string is stored to the register 56 in the order of the partial bit strings a1, a2, a3, and a4. Accordingly, at the time when the partial bit strings a1-a4 from the shift register 54 and 55 are stored, the shift register 56 stores 16-bit signals. The 16-bit signal includes the first higher bit string D1H, the first lower bit string D1L, the second higher bit string D2H and the second lower bit string D2L in this order. The shift register 56 serially outputs the 16-bit signal as the digital signal d5 to the terminal 52. The switch SW2 applies the reproduced signals d5 outputted from the image memory 9 to the D/A converter 11 as the reproduced signals d6.

The D/A converter 11 converts the reproduced signals d6 into analog signals and outputs the same as video signals.

When the reproduced signal processing circuit 2 finishes reading the signals in the subsequent field and starts to output the reproduced signals d1, the circuit 2 causes the flag FL1 to attain the high level again. The control portion 4, in response to the flag signal FL1 attaining the high level again, inverts the control pulses SW1 and SW2. Namely, the control pulses SW1 and SW2 attain the low level and the high level, respectively. The switch 3 connects the terminals 41 and 43. The switch 6 connects the terminals 62 and 63. The switch 7 connects the terminals 71 and 73. The switch 1 connects the terminals 51 and 53.

The image memory 8 receives the clock CK2 as the clock CK3 through the switch 6. The image memory 9 receives the clock CK1 as the clock CK4 through the switch 7. The image memory 9 also receives the reproduced signals d3 from the reproduced signal processing circuit 2.

The image memory 8 is controlled by the memory controller 12, and outputs 8-bit signals by combining the stored higher 4-bit signals and lower 4-bit signals as the reproduced signal d4 to the input terminal 51 of the switch 10, in synchronization with the clock CK3 (CK2). The switch 10 applies the reproduced signal d4 to the D/A converter 11 as the reproduced signal d6. The D/A converter 11 converts the reproduced signal d6 into an analog signal and outputs the analog signal as a video signal.

At the same time, the image memory 9 stores the image signals applied from the reproduced signal processing circuit 2 in the successive addresses in synchronization with the clock CK4 (CK1), in the same manner as the image memory 8 in one field before does. Accordingly, the signals stored in the image memory 9 are stored in the regions R3 and R4 of FIG. 8.

When the signal processing of the subsequent field starts again, the control pulses SW1 and SW2 are inverted. This time, the image memory 8 stores the reproduced signals again and the image memory 9 applies the 8-bit signals composed of the stored higher 4-bit and the lower 4-bit signals to the D/A converter 11. In this way, the image memories 8 and 9 alternately store the image for every field and output the same, so that the successive video signals can be obtained from the D/A converter 11.

FIGS. 6(a)-(m) are waveform diagrams of the principal signals for describing the operation of the video signal reproducing system. Referring to FIG. 6(a), the clock CK1 has a frequency synchronized with a travelling speed of the tape 1. Referring to FIG. 6(b), the clock CK2 outputted from the oscillation circuit 5 has a fewer number of pulses than that of the clock CK1. The reason why the frequency of the clock CK2 is selected to be smaller than that of the clock CK1, is that while the video signals reproduced from the tape 1 are intermittent in many cases, the video signals to be outputted from the D/A converter 11 should be continuous.

Referring to FIGS. 6(c) and (d), the reproduced signal processing circuit 2 causes the flag signal FL1 to attain the high level while outputting the reproduced signal d1 and causes the flag signal FL1 to attain the low level in other occasions. More specifically, in FIG. 6, the flag FL1 is at the high level in the time periods t0-t1, t2-t3 and t4-t5 and is at the low level in other periods. The reproduced signal d1 outputted from the reproduced signal processing circuit 2 also exists during the periods t0-t1, t2-t3 and t4-t5.

Referring to FIGS. 6(e) and (f), the switch 3 applies the reproduced signal d1 as the reproduced signal d2 to the image memory 8 during the time periods t0-t1 and t4-t5. During the time period t2-t3, the switch 3 applies the reproduced signal d1 as the reproduced signal d3 to the image memory 9.

Referring to FIGS. 6(i) and (j), the control pulses SW1 and SW2 complementarily invert every time the flag FL1 attains the high level. Accordingly, during the time period t0-t2, the control pulse SW1 is at the high level and the control pulse SW2 is at the low level. During the time period t2-t4, the control pulse SW1 is at the low level and the control pulse SW2 is at the high level. After the time point t4, the control pulse SW1 again attains the high level and the control pulse SW2 attains the low level.

Referring to FIGS. 6(g) and (h), the switches 6 and 7 switch the clocks CK1 and CK2, in response to the signal levels of the control pulses SW1 and SW2, and supply the clocks CK1 and CK2 as the clocks CK3 and CK4, respectively, to the image memory 10. Since the switch 6 is controlled by the control pulse SW1 and the switch 7 by the control pulse SW2, the clocks CK3 and CK4 are complementary to each other and have waveforms in which the clocks CK1 and CK2 appear alternately.

Referring to FIGS. 6 (k) and (l), during the time period t0-t2, the clock CK2 is inputted to the image memory 9 which outputs 8-bit digital reproduced signals d5. As the foregoing, the clock CK2 has a frequency smaller than that of the clock CK1. In this case it has a frequency approximately half that of the clock 1. Accordingly, the reproduced signal d5 is outputted over the time period t0-t2. As the foregoing, during the time period t0-t1, the image memory 8 stores the reproduced signal d2.

As the control pulses SW1 and SW2 invert at the time point d2, the image memory 9 stops outputting the reproduced signal d5. Instead, the clock CK2 is inputted to the image memory 8 which is caused to output the reproduced signal d4. The reproduced signal d4 is outputted over the time period t2-t4. In the mean time, th image memory 9 stores the reproduced signal d3 as described above.

Furthermore, at the time point t4, the control pulses SW1 and SW2 again invert, thereby the same processing are again performed as that performed in the time period t0-t2.

The reproduced signal d6 applied to the D/A converter 11 becomes an interleaved signal of the reproduced signals d4 and d5 outputted from the image memory 8 and 9. Accordingly, referring to FIG. 6 (m), the reproduced signal d6 becomes a continuous signal. Since the D/A converter 11 converts the signal into an analog signal and outputs the analog converted signal as a video signal, it is possible to reproduce the video signal by a conventional CRT or the like.

Figure 7:
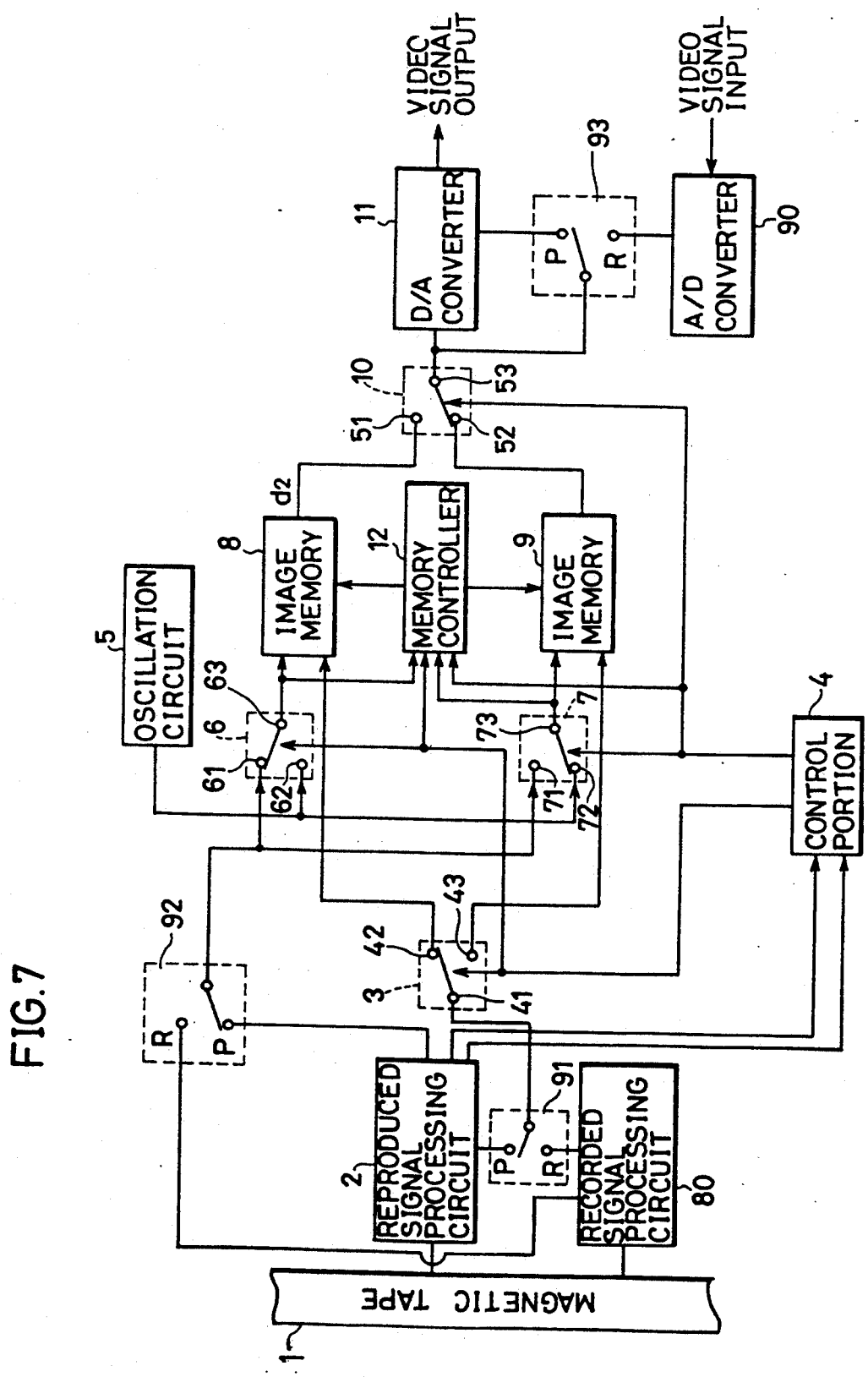
FIG. 7 is a block diagram of the magnetic recording and reproducing apparatus according to the present invention.

As the foregoing, the image recording system and the video signal reproducing system respectively shown in FIGS. 4 and 5 have many common portions. Accordingly, these portions can be shared by the two systems. Referring to FIG. 7, the apparatus differs from that shown in FIG. 5 in that it includes a recorded signal processing circuit 80 provided in parallel to the reproduced signal processing circuit 2, an A/D converter 90 provided in parallel to the D/A converter 11 and recording/reproducing switches 91 to 93.

The switch 91 has two input terminals and one output terminal. One of the input terminals of the switch 91 is connected to the reproduced signal processing circuit 2 and the other input terminal is connected to the recorded signal processing circuit 80. The output of the switch 91 is connected to the input terminal 41 of the switch 3. The switch 91 is for selectively connecting the reproduced signal processing circuit 2 or the recorded signal processing circuit 80 to the switch 3 in response to a recording/reproducing instructing signal (not shown).

The switch 92 has two input terminals and one output terminal. One of the input terminals and the other are connected to the recorded signal processing circuit 80 and the reproduced signal processing circuit 2, respectively. The output terminal of the switch 92 is connected to the input terminals 61 and 71 of the switches 6 and 7. The switch 92 is for selectively switching the clock CK1 between those outputted from the recorded signal processing circuit 80 and from the reproduced signal processing circuit 2 and applying the same to the switches 6 and 7, in response to the recording/reproducing instructing signals.

The switch 93 has two terminals and one common terminal. One of the terminals is connected to the D/A converter 11 and the other to the A/D converter 90. The common terminal is connected to the common terminal 53 of the switch 10. The switch 93 is for selectively connecting the A/D converter 90 or the D/A converter 11 to the switch 10, in response to the recording/reproducing instructing signal.

In case the externally applied recording/reproducing instructing signal indicates a recording operation, each of the common terminals of the switches 91, 92 and 93 is connected to the terminals indicated by the character "R" in the FIG. 7. As a result, the apparatus shown in FIG. 7 becomes equivalent to the image recording system shown in FIG. 4. In case the recording/reproducing instructing signal indicates a reproducing operation, each of the common terminals of the switches 91, 92 and 93 is connected to the terminal indicated by the character "P". As a result, the apparatus shown in FIG. 7 becomes equivalent to the video signal reproducing system shown in FIG. 5.

In FIG. 7, the same reference numerals and names are allotted to the same or the corresponding portions to those shown in FIGS. 4 and 5. The functions thereof are also the same. Accordingly, no details description thereof will be made here.

The foregoing is a description of a case where all of the higher and lower bits in the first and second fields are applied to the D/A converter 11. Accordingly, the analog video signals obtained from the D/A converter 11 are the normally reproduced signals, that is, the obtained signals reproduces the recorded video signals with high-fidelity.

However, a search of desired information through a normal reproducing operation as described above requires too much time in reproducing the picture. Therefore, in the magnetic recording and reproducing apparatus according to the present invention, such a reproducing operations as follows is performed in a search mode.

In searching desired information, it is not always necessary to reproduce all the image with high-fidelity. In many cases, it will be enough just to find an outline of the information included in the image. Accordingly, referring to FIG. 8, for example, reproducing only the higher 4 bits in the first field stored in the region R1 as video signals accomplishes the object of the search sufficiently. The object of the search can be fully accomplished by adding the higher 4-bit signals in the second field stored in the region R3 or by further outputting all the data stored in the regions R1 and R2 with respect to the first field. Selection of the information from the higher bits and the lower bits in the first and second fields as video signals to be outputted is arbitrary.

The memory controller 12 outputs such signals as described above by controlling the image memories 8 and 9 at the time of reproduction in the search mode. For example, in case of the reproduction of the higher 4 bits in the first field only, the memory controller 12 operates as follows. The memory controller 12 outputs the higher 4-bit data stored in the region R1 by controlling the image memory 8 and at the same time converts the 4-bit data into the 8-bit data. This conversion is made by, for example, adding a 4-bit binary signal "0000" to the left end of the above-described higher 4-bit data. The reproduced signal d4 thus generated is applied to the D/A converter 11 and converted into a conventional analog video signal.

On the other hand, the memory controller 12 causes the image memory 9, for example, to output no data. Instead, the controller 12 causes the memory 9 to output the signals all having "0" as the reproduced signals d5 to the switch 10. Consequently, the video signals outputted from the D/A converter 11 become video signals having only the characteristics of the higher 4 bits of only the first field.

FIG. 10A shows one example of an original picture recorded on the tape 1. The original picture represents a character "A". The character "A" has a specific color.

FIG. 10B shows reproduced image obtained with all the higher bits and the lower bits in the first and second fields. In this case, the obtained image is completely the same as the original picture shown in FIG. 10A.

When reproduced with only the higher bit data in the first field stored in the region R1 shown in FIG. 8, such picture as shown in FIG. 10C is obtained. In this case, since no information in the second field is reproduced, the configuration of the character "A" is incomplete. In addition, as the information representing the image in the first field is insufficient and especially lacking in color information, the character "A" is colored vaguely. However, some kind of information is possible to be fully recognized through such picture. Furthermore, the number of scanning lines included in one field is large enough in practice, whereby the contents of the obtained image will be recognizable.

Referring to FIG. 10D, in case video signals are reproduced with all the higher and lower bits in the first field and without those in the second field, a configuration of the image obtained is incomplete, similarly to that of FIG. 10C. However, at least the information of the first field is complete and the character "A" in that part has the same color as that of the original picture.

Referring to FIG. 10E, when the picture is reproduced further including the higher bit information of the second field, the picture in the second field can be reproduced, though it has only a small amount of information. Accordingly, an outline of the picture becomes same as that of the original picture. Since color information is insufficient in the second field, there exist a intermittent portions not having the original color.

It is possible to recognize the contents of the information in such images as shown in FIGS. 10D and 10E more clearly than that shown in FIG. 10C. In addition, since much less information is required for the reproduction than for a conventional reproduction, as the foregoing, a time period required for the reproduction can be significantly shortened than in the conventional one. For example, three out of four tracks on the magnetic tape can be skipped. Therefore, an operator does not get irritated any more when he/she searches certain information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic reproducing system for reproducing signals, comprising:
    a magnetic recording medium for storing said signals to be reproduced of a plurality of channels recorded on a plurality of tracks,
    said plurality of tracks including a first track and a second track,
    said first track containing first digital signals, from one of said plurality of channels, having a predetermined first number of bits,
    said second track containing second digital signals, from another of said plurality of channels, having a predetermined second number of bits;
    magnetic means for separately reproducing said first digital signals contained on said first track and said second digital signals contained on said second track;
    first signal generating means for generating digital signals having a third number of bits different from said predetermined first and second number of bits based on said reproduced first and second digital signals;
    said first signal generating means generating digital signals including information from said reproduced first and second digital signals in a normal reproduction mode, and said first signal generating means generating digital signals including information from one of said reproduced first and second digital signals in a search mode in order to minimize the time required to search said magnetic recording medium; and
    converting means for converting said generated digital signals having the third number of bits into analog signals.

2. The magnetic reproducing system of claim 1, wherein said predetermined first number of bits and said predetermined number of bits second are equal to each other.

3. The magnetic reproducing system of claim 2, wherein said third number of bits is equal to the sum of said predetermined first number of bits and said predetermined second number of bits.

4. The magnetic reproducing system of claim 3, wherein
    said first signal generating means comprises arraying means for alternately arraying said first digital signals and said second digital signals and for outputting said digital signals having said third number of bits in the normal reproduction mode.

5. The magnetic reproducing system of claim 4, wherein
    said first signal generating means further comprises bit number converting means for converting said predetermined first number of bits of said first digital signals into said third number of bits in the search mode.

6. The magnetic reproducing system of claim 5, wherein said first signal generating means further comprises selecting means adapted to receive predetermined selecting signals for selecting one of said arraying means and said bit number converting means and responsive to said selecting means for selecting one of an output of said arraying means and an output of said bit number converting means and for applying the same to said converting means.

7. The magnetic reproducing system of claim 4, wherein said arraying means comprises:
    first memory means for storing a succession of said first digital signals in successive positions,
    second memory means for storing a succession of said second digital signals in other successive positions, and
    alternate reading means for alternately reading the successive positions of said first memory means and the other successive positions of said second memory means to output said digital signals having said third number of bits.

8. The magnetic reproducing system of claim 5, wherein said bit number converting means comprises:
    memory means for storing a succession of said first digital signals in successive positions, and
    bit adding means for sequentially reading the succession of said stored first digital signals and for adding said second digital signals to higher bits of said first digital signals.

9. The magnetic reproducing system of claim 1, said plurality of tracks further including third and fourth tracks,
   said third track containing third digital signals having said predetermined first number of bits,
   said fourth track containing fourth digital signals having said predetermined second number of bits, and
   said magnetic means further separately reproducing said third digital signals on said third track and said fourth digital signals on said fourth track.

10. The magnetic reproducing system of claim 9, further comprising second signal generating means for generating digital signals having said third number of bits, based on said third and fourth digital signals reproduced by said magnetic means.

11. The magnetic reproducing system of claim 10, wherein said first signal generating means comprises first arraying means for alternately arraying said first digital signals and said second digital signals and for outputting digital signals having said third number of bits.

12. The magnetic reproducing system of claim 11, wherein said second signal generating means comprises second arraying means for alternately arraying said third digital signals and said fourth digital signals and for outputting digital signals having said third number of bits.

13. The magnetic reproducing system of claim 12, further comprising switching means for selecting an output of said second arraying means when said magnetic means reproduces said first and second tracks, and for selecting an output of said first arraying means when said magnetic means reproduces said third and fourth tracks, and for applying the same to said converting means.

14. The magnetic reproducing system of claim 12, wherein said second signal generating means further comprises:
   first bit number converting means for converting the predetermined number of bits of said first digital signal into said third number of bits in the search mode, and
   first selecting means for selecting either the output of said first arraying means or the output of said first bit number converting means and for outputting the same.

15. The magnetic reproducing system of claim 14, wherein said second signal generating means further comprises:
   second bit number converting means for converting the predetermined number of bits of said second digital signal into a said third number of bits in the search mode, and
   second selecting means for selecting either the output of said second arraying means or the output of said second bit number converting means and for outputting the same.

16. The magnetic reproducing system of claim 15, further comprising switching means for selecting an output of said second selecting means when said magnetic means reproduces said first and second tracks and for selecting an output of said first selecting means when said magnetic means reproduces said third and second tracks and for applying the same to said converting means.

17. A magnetic recording and reproducing apparatus for recording signals of a plurality of channels on a plurality of tracks on a magnetic recording medium and reproducing said signals of the plurality of channels from said tracks, comprising:
   first converting means for converting said signals of the plurality of channels into digital signals having a predetermined bit number,
   signal dividing means for dividing said signals of the plurality of channels converted into the digital signals by said first converting means into first digital signals having a predetermined first bit number and second digital signals having a predetermined second bit number for each of said channels,
   said first digital signals including the most significant bits of said signals of the plurality of channels and said second digital signals including the least significant bits of said signals of the plurality of channels,
   signal permuting means for permuting said first digital signals and said second digital signals so that said first digital signals and said second digital signals of the same channel are recorded on different ones of said plurality of tracks,
   magnetic means for recording said permuted first digital signals and second digital signals on said different ones of said plurality of tracks on said magnetic recording medium and for separately reproducing said first digital signals and said second digital signals recorded on said different ones of said plurality of tracks,
   first signal generating means for generating digital signals having said predetermined bit number, based on said first and second digital signals reproduced by said magnetic means, and
   second converting means for converting said digital signals having said predetermined bit number outputted from said first signal generating means into analog signals,
   said first signal generating means the generating digital signals including information from said reproduced first and second digital signals in a normal reproduction mode and said first signal generating means generating the digital signals including information from one of said reproduced first and second digital signals in a search mode in order to minimize the time required to search said magnetic recording medium.

18. A magnetic reproducing method of reproducing digital signals of a plurality of channels recorded on a plurality of tracks on magnetic recording medium,
   said plurality of tracks including a first track and a second track,
   said first track containing first digital signals, from one of said plurality of channels, having a first predetermined number of bits,
   said second track containing second digital signals, from another of said plurality of channels, having a second predetermined number of bits,
   said method comprising the steps of:
   (a) separately reproducing said first digital signals recorded on said first track and said second digital signals recorded on said second track;
   (b) generating digital signals having a third number of bits different from said first predetermined number of bits and said second predetermined number of bits, based on said reproduced first digital signals and said reproduced second digital signals, wherein said generated signals include information from said reproduced first and second digital signals in a normal reproduction mode, and said generated signals include information from one of said reproduced first and second digital signals in a search mode in order to minimize the time required to search said magnetic recording medium; and (c) converting said generated signals having the third number of bits into analog signals.

19. The magnetic reproducing method of claim 18, wherein said step (b) includes the sub-step of:

(b)(1) outputting digital signals having a said third number of bits by alternately arraying said first digital signals and said second digital signals in the normal reproduction mode.

20. The magnetic reproducing method of claim 14, wherein said step (b) further includes the sub-step of:

(b)(2) converting the first predetermined number of bits of said first digital signals into said third number of bits in the search mode.

21. A magnetic reproducing method according to claim 20, wherein said step (b) further includes the sub-step of:

(b)(3) selecting one of said digital signals having said third number of bits arrayed in said sub-step (b)(1) and said first digital signals with the first predetermined number of bits converted into said third number of bits in said sub-step (b)(2).

22. A magnetic recording and reproducing method of recording digital signals of a plurality of channels having a predetermined bit number on a plurality of tracks on a magnetic recording medium and reproducing said signals of the plurality of channels from said tracks, comprising the steps of:

dividing said digital signals into first digital signals having a predetermined first number of bits and second digital signals having a predetermined second number of bits for each of said channels, permuting said first and second digital signals so that said first and second digital signals of the same channel are recorded on different ones of said plurality of tracks, recording said permuted first and second digital signals on said different ones of said plurality of tracks on said magnetic recording medium, separately reproducing said first and second digital signals recorded on said different ones of said plurality of tracks, generating digital signals having said predetermined bit number, based on said reproduced first and second digital signals, including information from said reproduced first and second digital signals in a normal reproduction mode, and information from one of said reproduced first and second digital signals in a search mode in order to minimize the time required to search said magnetic recording medium, and converting said generated digital signals having the predetermined bit number into analog signals.

* * * * *